(12) United States Patent
Chernyavsky

(10) Patent No.: US 10,783,134 B2
(45) Date of Patent: Sep. 22, 2020

(54) POLLING PROCESS FOR MONITORING INTERDEPENDENT HARDWARE COMPONENTS

(71) Applicant: EMC IP Holding Company LLC, Hopkinton, MA (US)

(72) Inventor: Yuri Chernyavsky, Petach Tiqwa (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 286 days.

(21) Appl. No.: 16/050,818

(22) Filed: Jul. 31, 2018

(65) Prior Publication Data
US 2020/0042622 A1    Feb. 6, 2020

(51) Int. Cl.
*G06F 16/00* (2019.01)
*G06F 16/23* (2019.01)

(52) U.S. Cl.
CPC ...... *G06F 16/2343* (2019.01); *G06F 16/2379* (2019.01)

(58) Field of Classification Search
CPC .......................... G06F 16/2343; G06F 16/2379
See application file for complete search history.

(56) References Cited

U.S. PATENT DOCUMENTS

| 7,444,464 B2 | 10/2008 | Urmston et al. |
| 8,095,726 B1 | 1/2012 | O'Connell et al. |
| 8,214,612 B1 | 7/2012 | Natanzon |
| 9,015,110 B2 * | 4/2015 | Bajaria ............ G06F 16/24556 707/609 |
| 9,104,326 B2 | 8/2015 | Frank et al. |
| 9,208,162 B1 | 12/2015 | Hallak et al. |

(Continued)

FOREIGN PATENT DOCUMENTS

WO    2016111954 A1    7/2016

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Usmaan Saeed
*Assistant Examiner* — Paul Kim
(74) *Attorney, Agent, or Firm* — Ryan, Mason & Lewis, LLP

(57) ABSTRACT

Systems and methods are provided to implement a polling process for monitoring a system of interdependent hardware components. A shared aggregate state data structure comprising information of an aggregate state of the interdependent hardware components is maintained in a system memory. A poller loop process generates and utilizes two local instances in system memory of the shared aggregate state data structure, including a current state data structure and a previous state data structure. The current state data structure is utilized during a lock-free polling routine to store current aggregate state data of the interdependent hardware components, while other executing threads outside the poller loop process can access the shared aggregate state data structure. The shared aggregate state data structure is updated by performing a merge of state information contained in the shared aggregate state, current aggregate state, and previous aggregate state data structures.

20 Claims, 4 Drawing Sheets

(56) References Cited

U.S. PATENT DOCUMENTS

| | | | |
|---|---|---|---|
| 9,286,003 | B1 | 3/2016 | Hallak et al. |
| 9,606,870 | B1 | 3/2017 | Meiri et al. |
| 9,716,754 | B2 | 7/2017 | Swift |
| 2008/0120304 | A1* | 5/2008 | Calio ................. G06F 16/2386 |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2012/0198108 | A1 | 8/2012 | Williamson et al. |
| 2013/0325824 | A1 | 12/2013 | Shoens |
| 2014/0181016 | A1 | 6/2014 | Whitehead et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0373302 | A1* | 12/2016 | Sigoure ............... H04L 41/0856 |
| 2017/0192857 | A1 | 7/2017 | Meiri et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (Fast), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

POLLING PROCESS FOR MONITORING INTERDEPENDENT HARDWARE COMPONENTS

FIELD

This disclosure relates generally to hardware monitoring and management techniques and, in particular, to polling routines for reading hardware state information.

BACKGROUND

Embedded applications which manage hardware components typically utilize hardware polling methods to periodically check the state of the hardware components (e.g., operating status, diagnostic information, etc.) In many data processing and storage systems, such as JBOD (just a bunch of disks) storage systems comprising storage disk arrays, there are various interrelationships and interdependencies between the set of hardware components of such systems. In this regard, the polling and monitoring software must be able to present an overall state of the hardware system which is consistent with respect to the interrelationships and interdependencies between the hardware components. The ability to maintain consistency requires the collected status information of the hardware components to be mutually atomic. However, such atomicity may result in penalties due to requisite blocking on locks needed to achieve atomicity. Accordingly, polling methods are needed to provide an atomic, yet blocking-free view of sets of interdependent hardware components of a computing system.

SUMMARY

Illustrative embodiments of the invention include methods for implementing a polling process for monitoring a system of interdependent hardware components. For example, a method includes maintaining a first data structure in a system memory, wherein the first data structure comprises aggregate state information of a set of interdependent hardware components of a computing system; and performing a poller loop process to update the aggregate state information contained in the first data structure. The poller loop process comprises: acquiring a lock on the first data structure in the system memory; copying the aggregate state information of the first data structure into a second data structure and a third data structure in the system memory, wherein the aggregate state information of the second data structure is maintained as previous aggregate state information, and wherein the third data structure is maintained and updated with current aggregate state information; releasing the lock on the first data structure in the system memory after copying the aggregate state information of the first data structure into the second and third data structures in the system memory; performing a lock-free poller routine to collect current aggregate state information of the set of interdependent hardware components of the computing system, and store the currently collected aggregate state information into the third data structure in the system memory; reacquiring the lock on the first data structure in the system memory; updating the aggregate state information of the first data structure based on state information contained in at least one of the second data structure and the third data structure; and releasing the reacquired lock on the first data structure after updating the aggregate state information of the first data structure.

Other embodiments of the invention include, without limitation, computing systems and articles of manufacture comprising processor-readable storage media for implementing a polling process for monitoring a system of interdependent hardware components.

DETAILED DESCRIPTION

Figure 1:
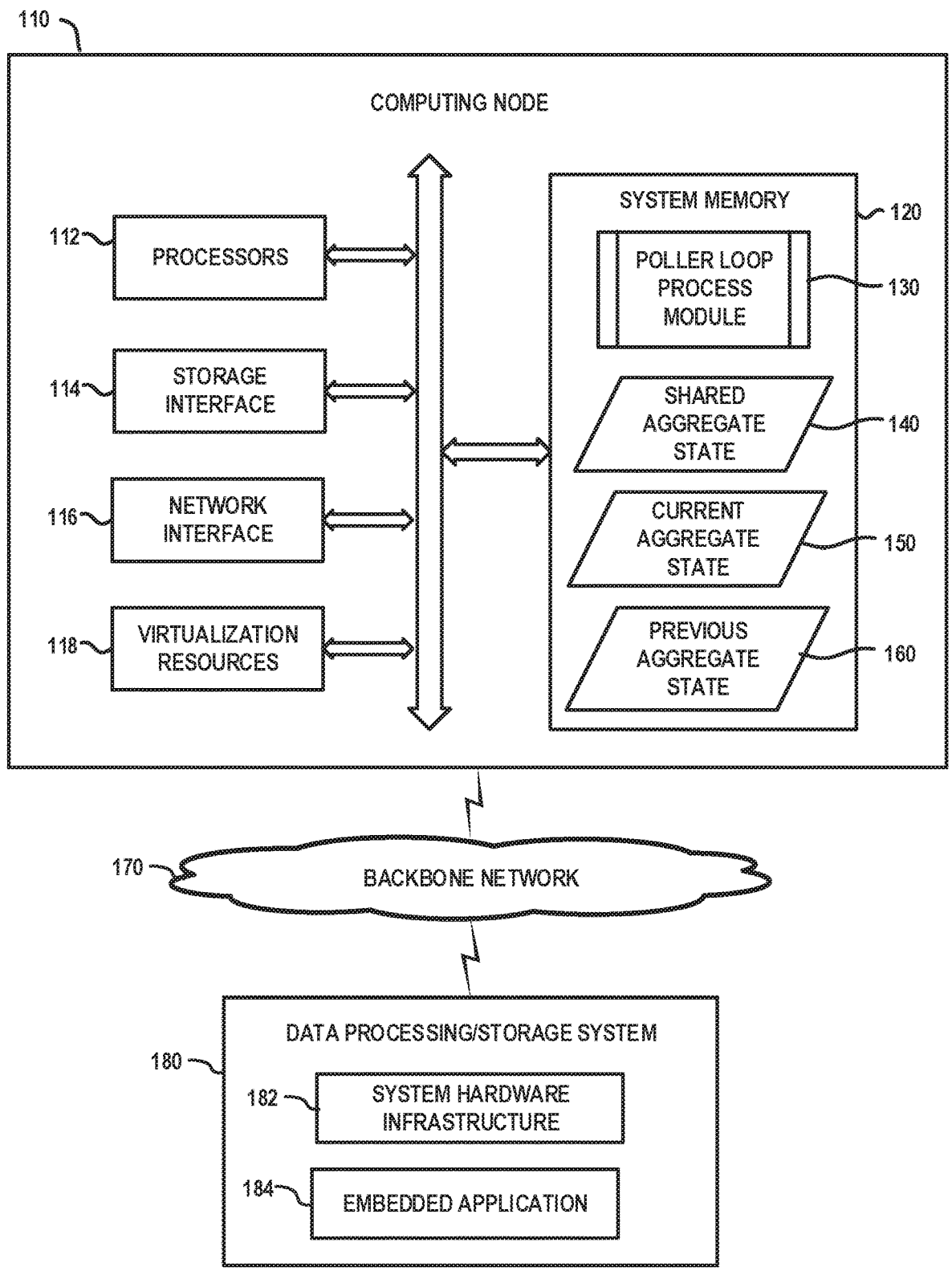
FIG. 1 is a high-level schematic illustration of a computing system which implements a polling process to monitor a system of interdependent hardware components, according to an embodiment of the invention.

Illustrative embodiments of the invention will now be explained in further detail with regard to systems and methods for implementing a polling process for monitoring a system of interdependent hardware components. For example, FIG. 1 is a high-level schematic illustration of a computing system 100 which implements a polling process to monitor a system of interdependent hardware components, according to an embodiment of the invention. The computing system 100 comprises a computing node 110 (e.g., server node) comprising processors 112, storage interface circuitry 114, network interface circuitry 116, virtualization resources 118, and system memory 120. The system memory 120 comprises program instructions of a poller loop process module 130, and data structures (e.g., structs) comprising a shared aggregate state data structure 140, a current aggregate state data structure 150 (or "current state"), and a previous aggregate state data structure 160 (or "previous state"), which are generated and managed by the poller loop process module 130. The computing system 100 further comprises a backbone network 170, and a data processing/storage system 180 comprising a hardware infrastructure 182 and an embedded application 184. The computing node 110 is coupled to the data processing/storage system 180 through the backbone network 170. As explained in further detail below, the poller loop process module 130 comprises methods that are configured to poll hardware devices within the hardware infrastructure 182 of the data processing/storage system 180 and generate/update the shared aggregate state data structure 140 to include information regarding the overall state of components of the system hardware infrastructure 182.

While the computing system 100 is generically illustrated in FIG. 1, it is to be understood that the computing system 100 can be implemented as part of a private or public computing platform (e.g., an enterprise network, a data center, a cloud computing system, etc.), or other types of computing systems comprising distributed virtual infrastructure and those not comprising virtual infrastructure. The computing node 110 can be a server node within the computing system 100 which is utilized by a system administrator for managing the data processing/storage system 180.

The processors 112 comprise one or more types of hardware processors that are configured to process program instructions and data to execute a native operating system (OS) and applications that run on the computing node 110. For example, the processors 112 may comprise one or more central processing units (CPUs), a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc.

The storage interface circuitry 114 enables the processors 112 to interface and communicate with the system memory 120, and other local storage and off-infrastructure storage media, using one or more standard communication and/or storage control protocols to read data from or write data to volatile and non-volatile memory/storage devices. Such protocols include, but are not limited to, Non-Volatile Memory Express (NVMe), Peripheral Component Interconnect Express (PCIe), Parallel ATA (PATA), Serial ATA (SATA), Serial Attached SCSI (SAS), Fibre Channel, etc. The network interface circuitry 116 enables the computing node 110 to interface and communicate with a network and other system components. The network interface circuitry 116 comprises network controllers such as network cards and resources (e.g., network interface controllers (NICs) (e.g. SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, direct memory access (DMA) and RDMA data transfer protocols, etc.

The virtualization resources 118 can be instantiated to execute one or more applications or processes which are hosted by the computing node 110. For example, the virtualization resources 118 can be configured to implement the various modules and functionalities of the poller loop process module 130. In one embodiment, the virtualization resources 118 comprise virtual machines that are implemented using a hypervisor platform which executes on the computing node 110, wherein one or more virtual machines can be instantiated to execute functions of the computing node 110. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the computing node 110, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 118 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the computing node 110. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 120 comprises various types of memory such as volatile random-access memory (RAM), non-volatile random-access memory (NVRAM), or other types of memory, in any combination. The term "memory" or "system memory" as used herein refers to volatile and/or non-volatile memory which is utilized to store application program instructions that are read and processed by the processors 112 to execute a native operating system and one or more applications hosted by the computing node 110, and to temporarily store data that is utilized and/or generated by the native OS and application programs running on the computing node 110. For example, the system memory 120 may comprise dynamic random-access memory (DRAM) (e.g., DRAM DIMM (Dual In-line Memory Module), or other forms of volatile RAM. The system memory 120 may further comprise storage-class memory (SCM) comprising one or more types of non-volatile memory, which are accessible as a memory resource (e.g., a NAND Flash storage device, a solid-state drive (SSD) device, or other types of next generation non-volatile memory (NGNVM) devices).

In one embodiment, as noted above, the poller loop process module 130 comprises one or more software modules that are persistently stored in local storage resources and loaded into the system memory 120, and executed by the processors 112 to perform respective functions as described herein. In this regard, the system memory 120, and other memory or storage media as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The backbone network 170 comprises one or more communications networks to enable communication between the computing node 110 and the data processing/storage system 180, as well as communication between nodes within the data processing/storage system 180. The terms "backbone network" or "network" as used herein are intended to be broadly construed so as to encompass a wide variety of different network arrangements, including combinations of multiple networks possibly of different types. In this regard, the backbone network 170 in some embodiments comprises combinations of multiple different types of communications networks each comprising network devices configured to communicate using Internet Protocol (IP) or other related communication protocols. The backbone network 180 comprises intermediate points (such as routers, switches, etc.) and other elements that form a network backbone to establish communication paths and enable communication between network endpoints.

In particular, while the backbone network 170 is generically depicted in FIG. 1, depending on the network distribution and geographic location of the constituent components and nodes of the computing system 100, the backbone network 170 may comprise one or more of types of communications networks that are commonly used to implement cloud computing platforms, such as, but not limited to, a wide area network (WAN), a local area network (LAN), a wireless local area network (WLAN), etc., or combination of networks that implement communication protocols that are used by server nodes for inter-node network communication including, but not limited to, protocols such as TCP/IP, Gigabit Ethernet (GbE) (e.g., 10/25/40/100 GbE), remote direct memory access (RDMA), Infiniband (IB), Message Passing Interface (MPI), etc. RDMA protocols include, for example, RoCE (RDMA over Converged Ethernet), or iWARP (internet Wide Area RDMA Protocol). In addition, the backbone network 170 may comprises a storage network fabric which can be implemented using any suitable networking system and protocol to enable shared access to a data storage system by server nodes within a data center or cloud platform.

Figure 4:
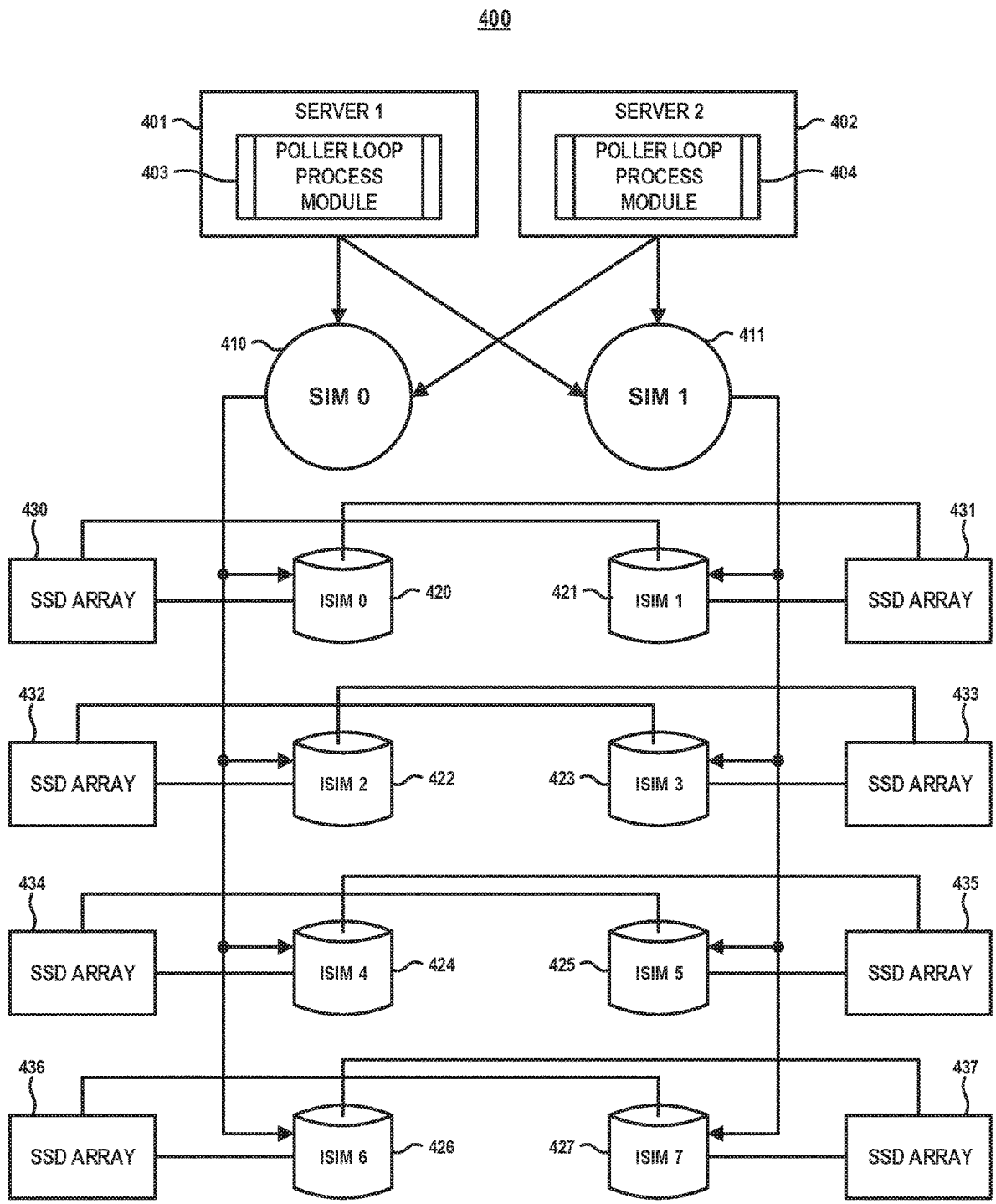
FIG. 4 schematically illustrates a data storage system which implements a polling process to monitor a system of interdependent hardware components of the data storage system, according to an embodiment of the invention.

The data processing/storage system 180 can be any type of data processing system (e.g., server cluster in data center) and/or data storage system in which the embedded application 184 is configured to manage the system hardware infrastructure 182 through device status information obtained through hardware polling by the poller loop process module 130. The data processing/storage system 180 can be a data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. In one exemplary embodiment, the data processing/storage system 180 can be a JBOD (just a bunch of disks) storage system comprising scalable data storage arrays such as hard disk drives (HDDs) or solid-state drives (SSDs), or other types and combinations of non-volatile memory. For example, as explained in further detail below, the data processing/storage system 180 can be implemented using the exemplary embodiment of a JBOD system with SSD arrays as schematically illustrated in FIG. 4.

In general, the poller loop process module 130 periodically invokes a poller routine to read the hardware and OS status information for each hardware component of the system hardware infrastructure 182 of the data processing/storage system 180. The hardware status information for each hardware component comprises, for example, serial number, access path, temperature, and other useful information that relates to hardware component state. The overall state of the hardware components as read by a single poller loop is referred to herein as an "aggregate state." The term "shared aggregate state" refers to the aggregate state information (e.g., the shared aggregate state data structure 140) which can be accessed by a poller loop process and executing threads or applications (outside of the poller loop process). In other words, the shared aggregate state structure 140 comprises a data structure to which shared access is provided to the poller loop process and other executing threads (under lock).

With the poller routine, the state of each component is read at a distinct point of time. However, at the moment a given component state is read, the state of one or more other components that was read earlier, may have already changed. This is acceptable as long as the poller routine is implemented in a way that the aggregate state produced by the poller loop process does not contain contradictions. For example, in a JBOD system with storage disks, the poller routine should read the state of the JBOD before reading the state of the storage disks to avoid a situation wherein the JBOD is reported as disconnected while the storage disks are reported as healthy.

More specifically, in the JBOD example, assume that a poller loop operation reads the JBOD state and then the disk state. After the poller loop completes, the JBOD is physically disconnected. A subsequent poller loop operation marks first the JBOD and then the disks as disconnected. Assume further that some executing thread reads the aggregate state right after the JBOD is marked as disconnected, but before the disks are marked as disconnected. The execution flow will conclude that the JBOD is disconnected but that the disks are healthy, which is a contradiction. This issue can be solved by requiring atomicity of the aggregate state.

The embedded application 184 may decide to call a poller routine several times in a single poller loop. This allows the hardware components within the system hardware infrastructure 182 to stabilize before their state is read. It is assumed that the hardware components eventually reach a period of stability. Assume that the poller loop process module 130 populates the shared aggregate state data structure 140 with the currently polled aggregate state information of the hardware infrastructure 182. The shared aggregate state data structure 140 is accessible by multiple execution flows (or application threads) that want to work with the hardware components. For instance, a diagnostic flow may access the shared aggregate state data structure 140 to obtain a list of connected disks or check the temperature information of the JBOD and storage disks to determine if the temperature of such components is below some threshold. In addition, application threads executing debugging or quality assurance flows may want to override some data fields within the shared aggregate state data structure 140, for example, to simulate overheating. In other instances, the embedded application 184 may want to override some data fields in the shared aggregate state data structure 140 as well.

In this regard, at a given point in time, the shared aggregate state data structure 140 can be accessed by an application thread (outside the poller loop) using a "read access" operation. With a read access operation, an application thread may access the shared aggregate state data structure 140 to retrieve device status information from one or more data fields of the shared aggregate state data structure 140. Since the shared aggregate state data structure 140 is shared by many executing threads, the read access operation performed by a given executing thread is protected by a lock (or mutex) on the shared aggregate state data structure 140 to prevent access to the shared aggregate state data structure 140 by other executing threads.

In addition, at a given point in time, the shared aggregate state data structure 140 can be accessed by an application thread (outside the poller loop) using a "write access" operation. With a write access operation, an application thread may access the shared aggregate state data structure 140 to change or override device status information in one or more data fields of the shared aggregate state data structure 140 to perform some target function, e.g., debugging, QA, etc. Since the shared aggregate state data structure 140 is shared by many executing threads, the write access operation performed by a given executing thread is protected by a lock (or mutex) on the shared aggregate state data structure 140 to prevent access to the shared aggregate state data structure 140 by other executing threads.

Furthermore, at a given point in time, the shared aggregate state data structure 140 can be accessed by an application thread (outside the poller loop) using a "read-PO-write access" operation. A read-PO-write access operation by an application thread is a more complicated access to the shared aggregate state data structure 140, and can involve hardware I/O or slow OS access which must break atomicity with respect to a lock on the aggregate state. For example, in a data storage application (e.g., JBOD), the executing thread may want to perform an encryption switch operation to change the encryption state of a storage array (e.g., change encryption state from a non-encrypted state to an encrypted state). In this instance, the executing thread will obtain a disk access path, execute an I/O query to switch the disk encryption state, poll the disk using I/O query until the expected encryption state is reached, and then update the new disk encryption state information in the shared aggregate state data structure 140 in system memory. The last step (thread updating aggregate state) is desired because reading the encryption status from disk is an expensive process to implement using the polling routine, so this step is only performed on the encryption state switch, rather than performing it on each polling loop.

More specifically, a "read-PO-write access" operation for an encryption switch can be performed by the executing thread: (1) acquiring a lock on the aggregate state; (2) reading the required values from the aggregate state; (3) releasing the lock on the aggregate state; (4) performing I/O using the information from step 2; (5) acquiring a lock on the aggregate state; (6) determining if the device is still connected, e.g., by checking the device ID against the value in the aggregate state; (7) release the lock and handle error, if the device is determined to be disconnected; (8) if device is connected, maintain the lock and update the aggregate state using, for example, the results from step 4; and (9) releasing the lock on the aggregate state.

In conventional approaches, the aggregate state is locked by a single lock or multiple locks, which also requires the entire poller loop process to run under lock. However, hardware I/O which may be slow or may even block, is performed under lock. As a result, other users of the lock may also be blocked. To overcome blocking on lock, some existing approaches employ an emergency flow that directly queries hardware components without accessing the aggregate state which is protected by lock. However, being unable to access aggregate state from the emergency flow may result in inconsistencies between the information reported by the two flows. For example, assume that the poller loop is stuck on I/O after having read the state of some hardware component that appears to be healthy. Now, the emergency flow is invoked and reads the state of the hardware component previously read, which is now disconnected. Now, the poller loop resumes and updates the aggregate state with the previously read component state, which is healthy. This is in spite of the fact that the hardware component is physically disconnected.

Embodiments of the invention provide systems and methods for implementing a polling process for polling a set of interdependent hardware components in which the aggregate state of the hardware components is maintained without contradictions, while providing "blocking-free" accesses to the aggregate state, e.g., read access, write access and read-PO-write access. Referring again to FIG. 1, to implement a polling process, the poller loop process module 130 generates and utilizes two local instances in system memory 120 of the same type as the shared aggregate state data structure 140, namely, the current state data structure 150 and the previous state data structure 160.

As explained in further detail below, the current state data structure 150 is utilized to collect and maintain a most recent aggregate state of the monitored set of hardware components. The collected data eventually becomes a new aggregate state. The previous state data structure 160 comprises a read only copy of the aggregate state of some previous point in time, and the previous state data structure 160 is utilized to perform a differential logic comparison between an old aggregate state and a new aggregate state. In addition, each access to the shared aggregate state data structure 140 is protected by a single lock, while the current state data structure 150 and previous state data structure 160 are not, and need not be, protected by locks.

Figure 2:
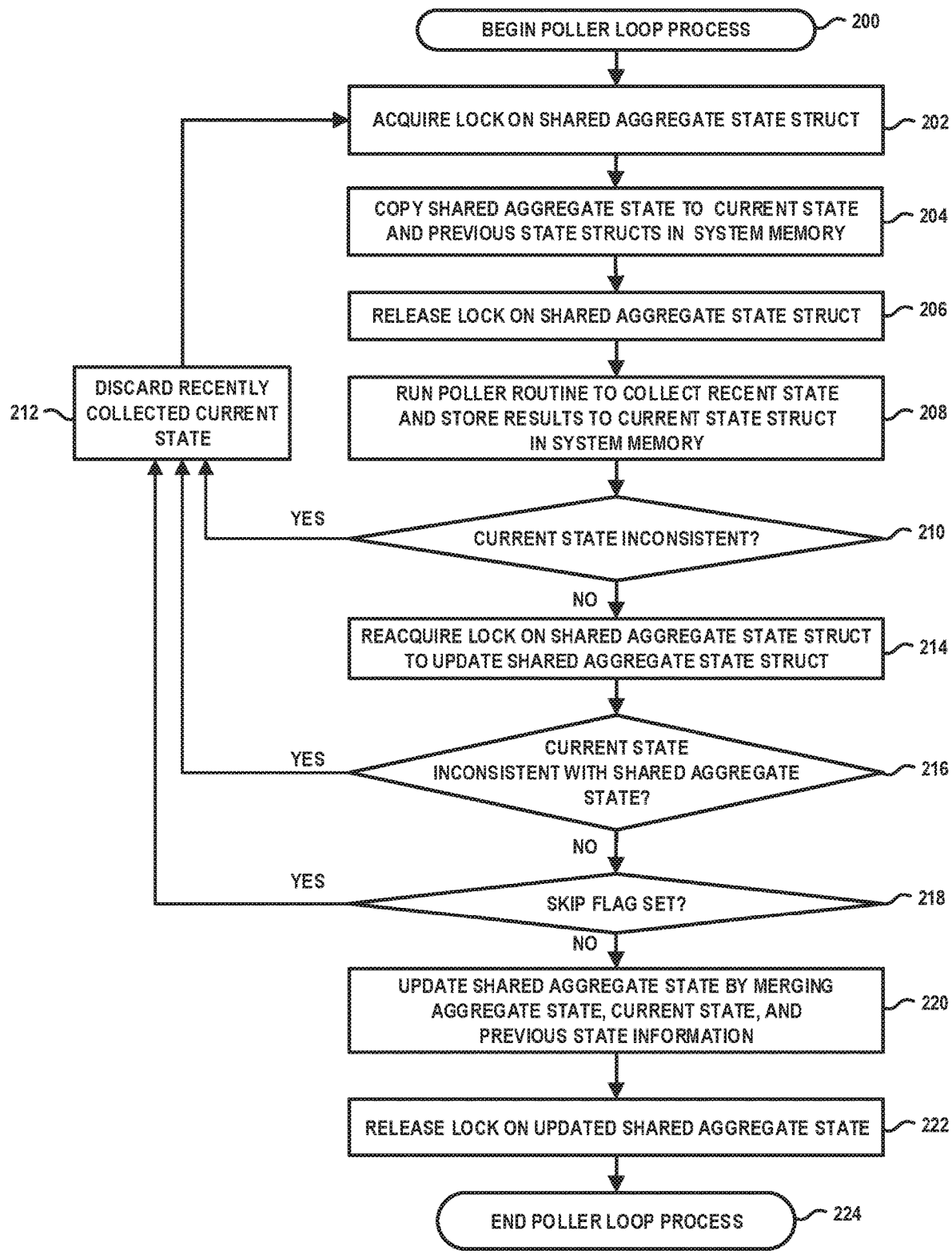
FIG. 2 is a flow diagram of a method for performing a polling process to monitor a system of interdependent hardware components, according to an embodiment of the invention.

FIG. 2 is a flow diagram of a method for performing a polling process to monitor a system of interdependent hardware components, according to an embodiment of the invention. The poller loop process module 130 begins a poller loop process (step 200) at the request of, e.g., the embedded application 184. As an initial step, the poller loop process acquires a lock on the shared aggregate state data structure 140 currently in system memory 120 (step 202). The information in the shared aggregate state data structure 140 is copied to the current state data structure 150 and the previous state data structure 160 (step 204). The poller loop process then releases the lock on the shared aggregate state (step 206). In this regard, the poller loop process acquires an initial lock on the shared aggregate state data structure 140 for a short time to enable the poller loop process to copy the shared aggregate state data structure 140 to the current and previous state structs, and then releases the lock to allow other executing threads to access the aggregate state, as needed, while the poller routine continues.

Next, the poller loop process executes a lock-free poller routine to poll the monitored set of hardware components and collect current device state information, and then store the collected device state information in the corresponding fields of the current state data structure 150 (step 208). Again, during execution of the poller routine, there is no lock on the shared aggregate state data structure 140. This lock-free poller routine allows the poller loop process to acquire the requisite system state information while other threads can access and utilize the shared aggregate state data structure 140 as needed. In this regard, if the time for performing the polling routine is relatively long due to, e.g., many I/O operations or other delays for acquiring the state information, the polling routine does not block access to the shared aggregate state. Moreover, even if the aggregate state is changed by some executing thread (outside the poller loop process), the state information of previous (unmodified)

aggregate state is maintained and accessible by the poller loop process in the previous state data structure 160.

Following the poller routine, a determination is made as to whether there is some inconsistency in the recently collected current state information (step 210). For example, there can be an inconsistency in the current state information, per se. As an example, in a JBOD system with disk storage arrays, the poller routine may check the status of the JBOD first, and then check the status of the disk storage arrays. If the currently collected initially indicates that the JBOD operational status is good, but upon checking the status of the associated disk storage arrays, the current status information indicates a JBOD failure, the poller loop process can deem there to be an inconsistency in the currently collected state information (affirmative determination in step 210). In another example, a hardware change during execution of the poller routine (step 208) can result in an inconsistency in the currently collected state information. At this point, the poller loop process can discard the currently collected aggregate state information (step 212), and repeat the process flow (steps 202, 204, 206 and 208) to collect a new set of current device state information.

On the other hand, if the poller loop process determines that there is no inconsistency in the currently collected state information (negative determination in step 210), the poller loop process proceeds to reacquire the lock on the shared aggregate state data structure 140 in system memory 120 for the purpose of updating the shared aggregate state data structure 140 (step 214). At this point, a determination is made as to whether information in the current state data structure 150 is inconsistent with information in the shared aggregate state data structure 140 (step 216). An inconsistency can arise, for example, in a given circumstance in which an executing thread modified one or more data fields in the shared aggregate state data structure 140 during the poller routine (step 208) when no lock was asserted (by the poller loop process) on the shared aggregate state data structure 140 in the system memory 120. For example, the shared aggregate state data structure 140 may comprise a parameter X which is set to value A, i.e., X=A (set by some application thread outside poller loop) while the current state data structure 150 may comprise a parameter Y which is set to value B, i.e., Y=B (set in the current state data structure 150 by the poller loop routine), wherein the values A and B for the respective parameters X and Y are logically contradictory, and inconsistent, for the given hardware system being monitored.

If the poller loop process determines that information in the current state data structure 150 is inconsistent with information in the shared aggregate state data structure 140 (affirmative determination in step 216), the poller loop process can discard the information of the current state data structure information (step 212), and repeat the process flow (steps 202, 204, 206 and 208) to collect a new set of current device state information. On the other hand, if the poller loop process determines that information in the current state data structure 150 is not inconsistent with information in the shared aggregate state data structure 140 (negative determination in step 216), a determination is made as to whether a skip flag has been set (step 218). A skip flag comprises an indicator that is set by an executing thread when, for example, the executing thread performs a write access operation on the shared aggregate state data structure 140 to modify one or more data fields. In this instance, if the poller loop process determines that a skip flag is currently asserted (affirmative determination in step 218), the poller loop process can discard the recently collected current state information (step 212), and repeat the process flow (steps 202, 204, 206 and 208) to collect a new set of current device state information.

On the other hand, if the poller process determines that a skip flag has not been set (negative determination in step 218), the poller loop process will proceed to update the shared aggregate state by merging information contained in the shared aggregate state data structure 140, the current state data structure 150 and/or the previous state data structure 160 (step 220). For example, if a data value in a given field of the shared aggregate state data structure 140 is determined to have been changed relative to data value in the corresponding field of the previous state data structure 160, then the data value for that field in the shared aggregate state data structure 140 will be deemed the current value for the updated shared aggregate state. Otherwise, the data values for the most recently populated current state data structure 150 will be deemed the current values for the updated shared aggregate state. When the process of updating the shared aggregate state data structure is complete, the poller loop process will release the lock on the updated shared aggregate state data structure (step 222), which then allows other executing threads (outside the poller loop process) to access the updated shared aggregate state data structure, as desired. At this point, the current iteration of the poller loop process is complete (step 224), and a next poller loop iteration can be commenced, for example, automatically at the expiration of a predetermined period or at the request of an embedded application, etc.

Figure 3:
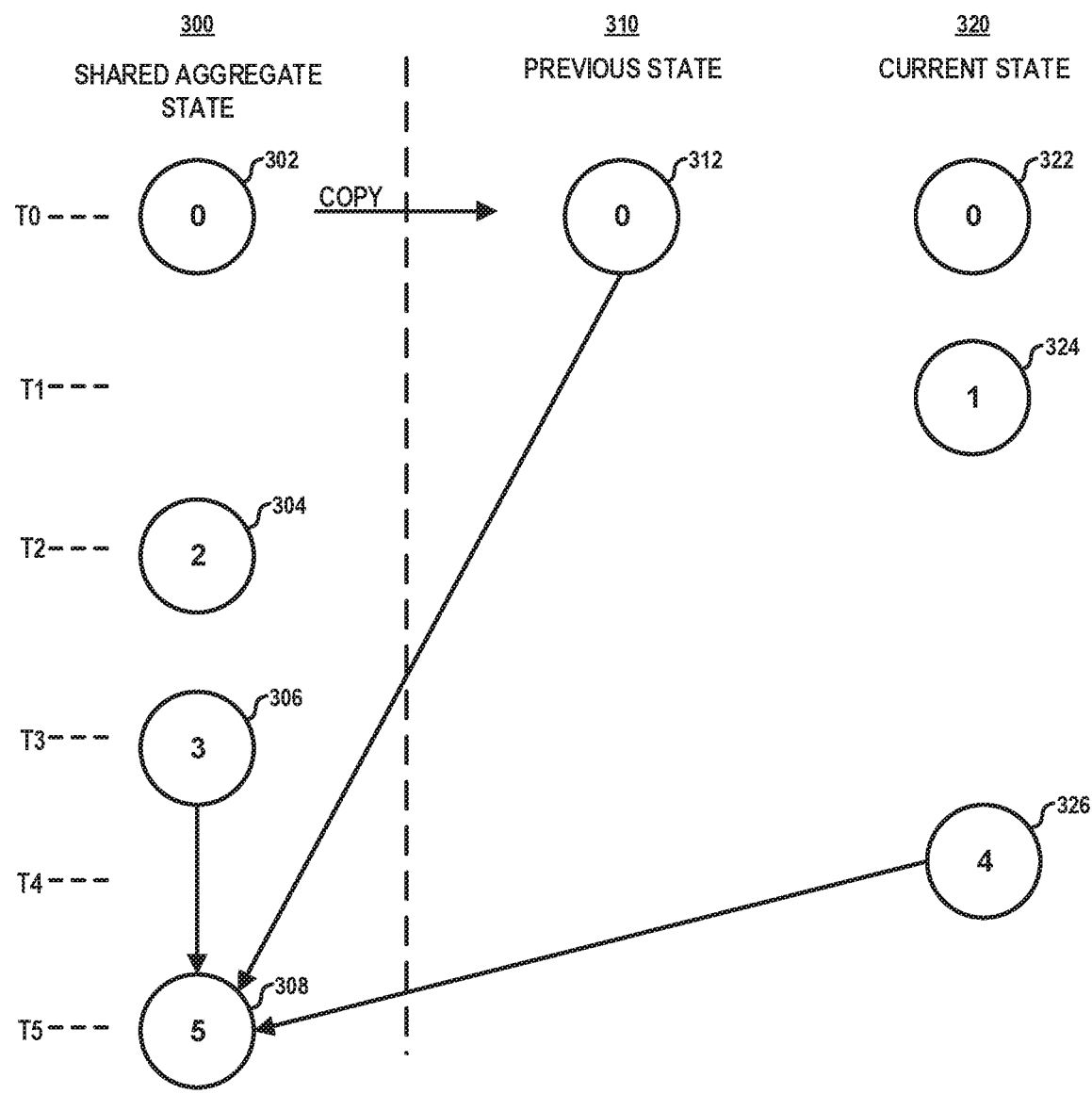
FIG. 3 schematically illustrates an exemplary polling process which is based on the process flow of FIG. 2, according to an embodiment of the invention.

FIG. 3 schematically illustrates an exemplary polling process which is based on the process flow of FIG. 2, according to an embodiment of the invention. FIG. 3 schematically depicts data structures of a shared aggregate state 300, a previous state 310, and a current state 320 which exist in system memory at different times T0, T1, T2, T3, T4, and T5 of a poller loop process. In particular, at time T0, a shared aggregate state 302 is copied under lock to a previous state 312 and a current state 322 (e.g., step 232 and 204, FIG. 2). At time T1, the poller loop process performs a poller routine (step 208, FIG. 2) and generates an updated current state 324. At time T2, an application (outside of the poller loop process) accesses and modifies the shared aggregate state 302, which results in an updated shared aggregate state 304. At time T3, an application (outside of the poller loop process) accesses and modifies the previously updated shared aggregate state 304, which results in a new updated shared aggregate state 306. At time T4, the poller loop process performs a poller routine (step 208, FIG. 2) and generates an updated current state 326. At time T5, the poller loop process generates an updated shared aggregate state 308 (step 220, FIG. 2) by performing a merge operation under lock to merge the information contained in the previously updated shared aggregate state 306, the previous state 312, and the previously updated current state 326.

FIG. 4 schematically illustrates a data storage system which implement a polling process to monitor a system of interdependent hardware components of the data storage system, according to an embodiment of the invention. In particular, FIG. 4 schematically illustrates a JBOD data storage system 400 comprising first and second storage servers 401 and 402, first and second rear Serial Attached SCSI (SAS) interface modules 410 and 411 (or SIMs), a plurality of internal SAS interface modules 420, 421, 422, 423, 424, 425, 426, and 427 (or ISIMs), and a plurality of SSD arrays 430, 431, 432, 433, 434, 435, 436, and 437. The first and second SIMs 410 and 411 provide two entry points to the JBOD data storage system 400. The first SIM 410 is coupled to the even-numbered ISIMs 420, 422, 424, and 426, and the second SIM 411 is coupled to the odd-numbered ISIMs 421, 423, 425 and 427.

In this configuration, the SIMs 410 and 411 and the ISIMs 420, 421, 422, 423, 424, 425, 426, and 427 provide a 2-level hierarchy of SAS expanders, wherein primary access to the even-numbered SSD arrays 430, 432, 434, and 436 is obtained through the first SIM 410 and the even-numbered ISIMs 420, 422, 424, and 426, respectively, and wherein primary access to the odd-numbered SSD arrays 431, 433, 435, and 437 is obtained through the second SIM 411 and the odd-numbered ISIMs 421, 423, 425, and 427, respectively. In addition, to provide redundant access, the even-numbered SSD arrays 430, 432, 434, and 436 are connected to the odd-numbered ISIMs 421, 423, 425, and 427, respectively, and the odd-numbered SSD arrays 431, 433, 435, and 437 are connected to the even-numbered ISIMs 420, 422, 424, and 426, respectively. In other words, the first and second SIMs 410 and 411 comprise top level SAS expanders to which the storage servers 401 and 402 are connected, respectively, and the the ISIMs (or row controllers) comprise bottom level SAS expanders to which the SSD arrays are connected. This allows each SSD array to be connected in the JBOD data storage system by two redundant SAS paths.

The hardware elements (e.g., SIMs, ISIMs and SSD arrays) in the data storage system 400 are tightly coupled and bear nontrivial mutual dependencies between them and, thus, the hardware elements cannot be properly monitored as separate entities. The storage servers 401 and 402 host poller loop process modules 403 and 404, respectively, which implement polling techniques as discussed above (e.g., FIG. 2) for monitoring a system of interdependent hardware components. The data storage system 400 of FIG. 4 can be implemented using a commercially available scale-out all-flash content addressable storage array platform XtremIO™ X2 from Dell EMC of Hopkinton, Mass. In this embodiment, the XtremIO™ X2 platform comprises storage controllers (XtremApp) which implement monitoring code for monitoring SSD modules. The SSD monitoring code can be configured to implement polling techniques according to exemplary embodiments of the invention as discussed herein.

It is to be appreciated that the polling techniques discussed herein provide hardware monitoring frameworks in which (1) all read accesses to a shared aggregate state are contradiction-free (i.e., access to the aggregate state is contradiction-free at all times) and (2) read and write accesses are non-blocking operations, and that a read-PO-write access is only blocking if it performs blocking I/O or slow OS access.

In particular, contradiction-free polling is achieved as follows. It is assumed that the poller loop and application accesses cannot introduce contradictions into the shared aggregate state as long as they run uninterrupted. In the case of a read-PO-write access operation, this is true for the read and the write portions of such access operation. Assume further that the shared aggregate state is contradiction-free after the system initialization phase. The shared aggregate state can be modified by one of the following actions: write access, read-PO-write access, or poller loop. It can be seen that for each one of these actions, as long as the shared aggregate state was contradiction-free prior the action, it will remain contradiction-free after the action as well.

For example, with regard to write and read-PO-write access operations, a shared aggregate state update is performed under lock. Hence, the resulting structure is contradiction-free. If the poller loop process is running in parallel, it is the responsibility of the poller loop process to resolve conflicts in a contradiction-free way, as discussed above. Moreover, with regard to the poller loop process, a three-way merge operation is performed under lock and is executed in a manner which cannot introduce contradictions, as discussed above.

Next, with regard to non-blocking functionality, as noted above, no I/O operations or slow OS access operations are performed under lock. As such, all read operations and all write operations of the different types of access operations noted above are effectively non-blocking. In addition, by implementing a lock-free poller routine (e.g., step 208, FIG. 2), the poller loop process essentially decouples I/O access and slow OS access from the shared aggregate state update process which is performed at an end of the poller loop process. As such, the poller loop minimizes or essentially eliminates blocking of the shared aggregate state.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:

maintaining a first data structure in a system memory, wherein the first data structure comprises aggregate state information of a set of interdependent hardware components of a computing system;

performing a poller loop process to update the aggregate state information contained in the first data structure, wherein performing the poller loop process comprises:

acquiring a lock on the first data structure in the system memory;

copying the aggregate state information of the first data structure into a second data structure and a third data structure in the system memory, wherein the aggregate state information of the second data structure is maintained as previous aggregate state information, and wherein the third data structure is maintained and updated with current aggregate state information;

releasing the lock on the first data structure in the system memory after copying the aggregate state information of the first data structure into the second and third data structures in the system memory;

performing a lock-free poller routine to collect current aggregate state information of the set of interdependent hardware components of the computing system, and store the currently collected aggregate state information into the third data structure in the system memory;

reacquiring the lock on the first data structure in the system memory;

updating the aggregate state information of the first data structure based on state information contained in at least one of the second data structure and the third data structure; and releasing the reacquired lock on the first data structure after updating the aggregate state information of the first data structure.

2. The method of claim 1, further comprising:
determining whether the currently collected aggregate state information comprises inconsistent device state information; and
discarding the currently collected aggregate state information in response to determining that the currently collected aggregate state information comprises inconsistent device state information.

3. The method of claim 1, further comprising:
before updating the aggregate state information of the first data structure, determining whether the currently collected aggregate state information in the third data structure in the system memory is inconsistent with the aggregate state information of the first data structure in the system memory; and
discarding the currently collected aggregate state information in response to determining that the currently collected aggregate state information in the third data structure in the system memory is inconsistent with the aggregate state information of the first data structure in the system memory.

4. The method of claim 1, further comprising:
before updating the aggregate state information of the first data structure, determining whether the aggregate state information of the first data structure comprises device state information which has been modified; and
discarding the currently collected aggregate state information in response to determining that the aggregate state information of the first data structure comprises device state information which has been modified.

5. The method of claim 4, wherein determining whether the aggregate state information of the first data structure comprises device state information which has been modified comprises determining if a flag for the first data structure has been asserted by an application thread, wherein the asserted flag indicates that the device state information in the first data structure has been modified by the application thread.

6. The method of claim 1, wherein updating the aggregate state information of the first data structure based on state information contained in at least one of the second data structure and the third data structure comprises:
determining whether a data value in a given field of the first data structure has changed relative to a data value in a corresponding field of the previous state maintained in the second data structure; and
maintaining the data value in the given field of the first data structure in response to determining that the data value in the given field of the first data structure has changed relative to the data value in the corresponding field of the previous state maintained in the second data structure.

7. The method of claim 6, further comprising updating the data value in the given field of the first data structure using a current data value in a corresponding field of the current state maintained in the third data structure in system memory, in response to determining that the data value in the given field of the first data structure has not changed relative to the data value in the corresponding field of the previous state maintained in the second data structure.

8. The method of claim 1, wherein the second data structure maintains a read-only copy of the aggregate state information.

9. The method of claim 1, wherein the set of interdependent hardware components comprises storage devices of a data storage system.

10. An article of manufacture comprising a processor-readable storage medium having stored therein program code of one or more software programs, wherein the program code is executable by one or more processors to implement a process comprising:
maintaining a first data structure in a system memory, wherein the first data structure comprises aggregate state information of a set of interdependent hardware components of a computing system;
performing a poller loop process to update the aggregate state information contained in the first data structure, wherein performing the poller loop process comprises:
acquiring a lock on the first data structure in the system memory;
copying the aggregate state information of the first data structure into a second data structure and a third data structure in the system memory, wherein the aggregate state information of the second data structure is maintained as previous aggregate state information, and wherein the third data structure is maintained and updated with current aggregate state information;
releasing the lock on the first data structure in the system memory after copying the aggregate state information of the first data structure into the second and third data structures in the system memory;
performing a lock-free poller routine to collect current aggregate state information of the set of interdependent hardware components of the computing system, and store the currently collected aggregate state information into the third data structure in the system memory;
reacquiring the lock on the first data structure in the system memory;
updating the aggregate state information of the first data structure based on state information contained in at least one of the second data structure and the third data structure; and
releasing the reacquired lock on the first data structure after updating the aggregate state information of the first data structure.

11. The article of manufacture of claim 10, further comprising program code which is executable by the one or more processors to implement a process comprising:
determining whether the currently collected aggregate state information comprises inconsistent device state information; and
discarding the currently collected aggregate state information in response to determining that the currently collected aggregate state information comprises inconsistent device state information.

12. The article of manufacture of claim 10, further comprising program code which is executable by the one or more processors to implement a process comprising:
before updating the aggregate state information of the first data structure, determining whether the currently collected aggregate state information in the third data structure in the system memory is inconsistent with the aggregate state information of the first data structure in the system memory; and
discarding the currently collected aggregate state information in response to determining that the currently collected aggregate state information in the third data structure in the system memory is inconsistent with the aggregate state information of the first data structure in the system memory.

13. The article of manufacture of claim 10, further comprising program code which is executable by the one or more processors to implement a process comprising:
before updating the aggregate state information of the first data structure, determining whether the aggregate state information of the first data structure comprises device state information which has been modified; and
discarding the currently collected aggregate state information in response to determining that the aggregate state information of the first data structure comprises device state information which has been modified.

14. The article of manufacture of claim 13, wherein determining whether the aggregate state information of the first data structure comprises device state information which has been modified comprises determining if a flag for the first data structure has been asserted by an application thread, wherein the asserted flag indicates that the device state information in the first data structure has been modified by the application thread.

15. The article of manufacture of claim 10, wherein updating the aggregate state information of the first data structure based on state information contained in at least one of the second data structure and the third data structure comprises:
determining whether a data value in a given field of the first data structure has changed relative to a data value in a corresponding field of the previous state maintained in the second data structure;
maintaining the data value in the given field of the first data structure in response to determining that the data value in the given field of the first data structure has changed relative to the data value in the corresponding field of the previous state maintained in the second data structure; and
updating the data value in the given field of the first data structure using a current data value in a corresponding field of the current state maintained in the third data structure in system memory, in response to determining that the data value in the given field of the first data structure has not changed relative to the data value in the corresponding field of the previous state maintained in the second data structure.

16. The article of manufacture of claim 10, wherein the second data structure maintains a read-only copy of the aggregate state information.

17. A system comprising:
a computing system comprising a hardware infrastructure comprising a set of interdependent hardware components; and
a computing node comprising at least one processor, and system memory comprising program instructions stored in the system memory, wherein the program instructions are executable by the at least one processor to perform a process comprising:
maintaining a first data structure in the system memory, wherein the first data structure comprises aggregate state information of the set of interdependent hardware components of the computing system;
performing a poller loop process to update the aggregate state information contained in the first data structure, wherein performing the poller loop process comprises:
acquiring a lock on the first data structure in the system memory;
copying the aggregate state information of the first data structure into a second data structure and a third data structure in the system memory, wherein the aggregate state information of the second data structure is maintained as previous aggregate state information, and wherein the third data structure is maintained and updated with current aggregate state information;
releasing the lock on the first data structure in the system memory after copying the aggregate state information of the first data structure into the second and third data structures in the system memory;
performing a lock-free poller routine to collect current aggregate state information of the set of interdependent hardware components of the computing system, and store the currently collected aggregate state information into the third data structure in the system memory;
reacquiring the lock on the first data structure in the system memory;
updating the aggregate state information of the first data structure based on state information contained in at least one of the second data structure and the third data structure; and
releasing the reacquired lock on the first data structure after updating the aggregate state information of the first data structure.

18. The system of claim 17, wherein the program instructions are executable by the at least one processor to perform a process comprising:
determining whether the currently collected aggregate state information comprises inconsistent device state information, and discarding the currently collected aggregate state information in response to determining that the currently collected aggregate state information comprises inconsistent device state information;
before updating the aggregate state information of the first data structure, determining whether the currently collected aggregate state information in the third data structure in the system memory is inconsistent with the aggregate state information of the first data structure in the system memory, and discarding the currently collected aggregate state information in response to determining that the currently collected aggregate state information in the third data structure in the system memory is inconsistent with the aggregate state information of the first data structure in the system memory; and
before updating the aggregate state information of the first data structure, determining whether the aggregate state information of the first data structure comprises device state information which has been modified, and discarding the currently collected aggregate state information in response to determining that the aggregate state information of the first data structure comprises device state information which has been modified.

19. The system of claim 17, wherein updating the aggregate state information of the first data structure based on state information contained in at least one of the second data structure and the third data structure comprises:
determining whether a data value in a given field of the first data structure has changed relative to a data value in a corresponding field of the previous state maintained in the second data structure;
maintaining the data value in the given field of the first data structure in response to determining that the data value in the given field of the first data structure has changed relative to the data value in the corresponding field of the previous state maintained in the second data structure; and updating the data value in the given field of the first data structure using a current data value in a corresponding field of the current state maintained in the third data structure in system memory, in response to determining that the data value in the given field of the first data structure has not changed relative to the data value in the corresponding field of the previous state maintained in the second data structure.

20. The system of claim 17, wherein the computing system comprises a data storage system and wherein the set of interdependent hardware components comprises storage devices of the data storage system.

* * * * *